K. KIJIMA.
FISH LURE.
APPLICATION FILED JUNE 4, 1919.

1,333,318.

Patented Mar. 9, 1920.

INVENTOR
Kenji Kijima
BY
Strong & Townsend
ATTORNEYS

UNITED STATES PATENT OFFICE.

KENJI KIJIMA, OF LOS ANGELES, CALIFORNIA.

FISH-LURE.

1,333,318.         Specification of Letters Patent.         Patented Mar. 9, 1920.

Application filed June 4, 1919. Serial No. 301,695.

*To all whom it may concern:*

Be it known that I, KENJI KIJIMA, a subject of the Emperor of Japan, residing at Los Angeles, in the county of Los Angeles and State of California, have invented new and useful Improvements in Fish-Lures, of which the following is a specification.

This invention relates to a fishing tackle and particularly pertains to a fish lure.

It is a matter of common knowledge that certain classes of fish, such as tuna, albicore, bonito-fish, yellow-tail and salmon are very fond of squid, and it has been found by experiment that by using a lure representative of squid, great success has been obtained in fishing.

It is the principal object of the present invention, therefore, to provide a squid-shaped lure or gig which is adapted to be mounted upon the lead of a fishing line in a manner to have considerable movement and to thus attract the fish, the lure being disposed adjacent to considerable fish hooks secured to the end of the lead.

The present invention contemplates the use of a lead line, to the end of which are secured fish hooks, and upon which lead a slidable and freely rotatable squid-shaped gig is mounted, the gig being so disposed as to drop down and partially obstruct the throat of the fishing hooks when the fish have been caught.

The invention is illustrated by way of example in the accompanying drawings, in which—

Figure 2:
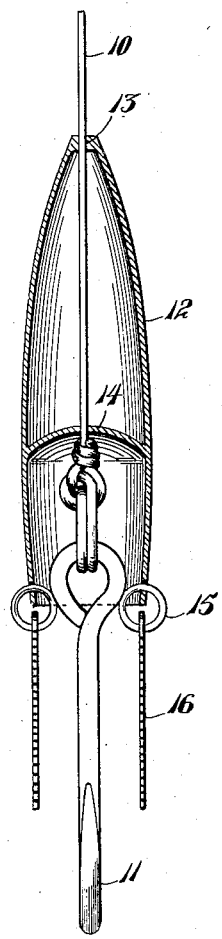
Fig. 2 is a view in longitudinal, central section, showing the formation of the walls of the lure and the manner in which spangles are fastened to the lure.
Figure 3:
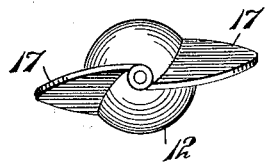
Fig. 3 is a view in end elevation, showing the design and arrangement of the fins mounted upon the squid-shaped body.

In the drawings, 10 indicates a lead line, at the end of which a plurality of fishing hooks 11 are secured. Mounted upon the lead line and adapted to hang down over and around the shanks of the hooks is a squid-shaped gig 12. The body portion of this member is long and tapering and converges at its upper end to a point through which a lead line opening 13 is formed. The opposite and enlarged end of the gig is open and is of sufficient diameter to accommodate the upper ends of the hooks. As shown in Fig. 2, an intermediate stop wall 14 is formed within the gig to limit the downward movement of the gig over the hooks. A series of perforations 15 are formed around and through the wall of the gig to receive rings 15. These rings carry dependent spangles 16 which hang down around the shanks of the hooks. These spangles are preferably made of bright metal and are formed with their edges serrated to produce a plurality of deflecting surfaces. The outer surface of the gig 12 is preferably polished and its walls are made of white metal, which may be easily seen in the water and will act to attract the fish.

The gig is adapted to whirl upon the lead line and is provided with fins 17 for this purpose. These fins are formed upon diametrically opposite sides of the tapering nose of the gig and are disposed at an inclination to the longitudinal center thereof so that the lure will whirl as it is drawn through the water. Attention is directed to the fact that while the lure is whirling, the hooks are standing stationary in relation to the lead line, thus making it possible for fish to be caught upon the hooks without being thrown off, due to the opening action of the lure and the hooks together, as is common in the operation of a great many devices of this character. It will also be evident that the lure will be forced down over the shanks of the hooks and will operate to hold the fish upon the hooks.

Figure 1:
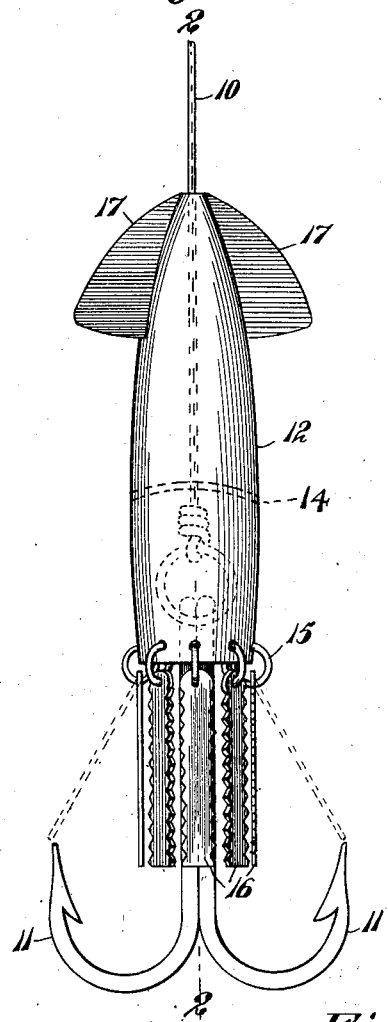
Figure 1 is a view in side elevation, showing the fish lure and the portion of the tackle upon which it is mounted.

In operation, the fishing tackle is assembled, as shown in Fig. 1, and is drawn through the water. As the fishing boat proceeds on its course of travel, the gig will be revolved around the lead line and will act to attract the fish. This is due, both to the nature of the reflecting surface upon the gig and the reflecting action of the spangles. When the fish have been attracted, they will bite at the imitation squid and will thus be caught.

While I have shown the preferred form of my invention, it will be understood that various changes in the combination, construction and arrangement of parts may be made by those skilled in the art, without departing from the spirit of the invention as claimed.

Having thus described my invention, what

I claim and desire to secure by Letters Patent is—

A fish lure comprising a gig open at the rear and tapering to a point at the front, a stationary line extending longitudinally through the lure, means to revolve the lure about the line, said means consisting of propeller blades fixed to the front end of the lure, hooks fixed to the lower end of the line with the shanks extending upwardly into the rear open end of the lure, openings around the rear end of the lure, rings loosely hung in said openings, and dependent metal spangles suspended from the rings and revoluble with the lure about the stationary hooks.

In testimony whereof I have hereunto set my hand in the presence of two subscribing witnesses.

KENJI KIJIMA.

Witnesses:
 GONGORO NAKAMURA,
 LORENE METCALF.